United States Patent [19]

Bellhouse et al.

[11] 4,383,921

[45] May 17, 1983

[54] APPARATUS FOR HEAT OR MASS TRANSFER

[76] Inventors: Brian J. Bellhouse; Francis H. Bellhouse, both of The Lodge, North St., Islip, Oxfordshire, England

[21] Appl. No.: 96,404

[22] Filed: Nov. 21, 1979

[51] Int. Cl.³ .......................................... B01D 31/00
[52] U.S. Cl. ................................ 210/321.1; 210/356; 210/456; 422/48
[58] Field of Search ....................... 165/157, 166, 167; 422/48; 55/16, 118; 210/356, 456, 321.3, 321.1

[56] References Cited

U.S. PATENT DOCUMENTS

| | | | |
|---|---|---|---|
| 3,212,642 | 10/1965 | Kylstra | 210/321.3 |
| 3,238,703 | 3/1966 | Straschyl et al. | 55/158 |
| 3,256,678 | 6/1966 | Bertin et al. | 55/158 |
| 3,864,248 | 2/1975 | Granger et al. | 210/356 X |
| 3,976,576 | 8/1976 | Jacobsen et al. | 210/321.3 |
| 4,075,091 | 2/1978 | Bellhouse | 210/321.4 X |
| 4,111,659 | 9/1978 | Bowley | 422/48 |
| 4,173,537 | 11/1979 | Newhart | 210/321.3 |
| 4,182,653 | 1/1980 | Bellhouse | 422/48 X |
| 4,222,869 | 9/1980 | Kato | 210/356 X |
| 4,240,907 | 12/1980 | Bentley | 210/321.3 |

Primary Examiner—Frank A. Spear, Jr.
Attorney, Agent, or Firm—Murray and Whisenhunt

[57] ABSTRACT

Apparatus for effecting transfer of heat or mass between two fluids through a transfer membrane comprises a conduit for flow of one of the fluids at least partly defined by the membrane. A wall of the conduit is provided with furrows preferably extending obliquely to the general direction of fluid flow through the conduit. Means, preferably comprising a unidirectional pump for providing mean flow and a pulsatile pump for superimposing reciprocatory pulsations on the mean flow, are provided for passing fluid through the conduit in pulsatile flow, so that eddies of the fluid are formed in the hollows provided by the furrows. When the conduit is defined between two predominantly planar surfaces, these surfaces may be separated, along the ridges between the furrows, by discontinuous webs, the openings in which provide communication between adjacent furrows. These features promote mixing of the fluid and its contact with the transfer membrane.

15 Claims, 4 Drawing Figures

APPARATUS FOR HEAT OR MASS TRANSFER

The invention is concerned with apparatus for effecting transfer of heat or mass between two fluids, of which at least one is usually a liquid, through a transfer membrane. We are particularly interested in blood oxygenators, that is artificial lungs, and dialysers, such as artificial kidneys, in which case one fluid is blood, and the other is oxygen or dialysate. In practice the efficiency of the transfer across the membrane is limited by the extent to which the total volume of fluid can be brought into close proximity with the membrane. It is not sufficient to reduce the thickness of the fluid layers, by reducing the thickness of the conduits in which they flow, as this increases undesirably the pressure drop across the apparatus and leads to uneven perfusion and regions of stagnation, which, in the case of blood, provides a danger of thrombosis.

We believe that the proper solution lies in so shaping the fluid flow conduits that significant mixing of the fluid occurs within the conduits. It has previously been proposed in British patent specification No. 1,442,754 to provide an apparatus comprising a conduit for flow of one of the fluids at least partially defined by the membrane, a transverse dimension of the conduit varying, either inherently or in response to pressure of fluid therein, in a regularly repeating manner along the length of the conduit, to provide a multiplicity of hollows, the apparatus also comprising means communicating with the conduit for passing fluid through the conduit in pulsatile flow, the arrangement being such that pulsation of fluid past the hollows give rise in the hollows to rotational fluid flow having components of motion parallel and perpendicular to the general direction of flow in the conduit of said one of the fluids.

The conduit may be tubular with its wall provided by a membrane. Alternatively the conduit may be defined between two predominently planar surfaces, so that it has an elongate cross section transverse to the general direction of flow through the conduit, at least one of the surfaces then being provided by a membrane. The requisite hollows may then be provided by furrowing the or at least one of the surfaces defining the conduit and as disclosed in specification No. 1,442,754, the resulting furrows and ridges extend perpendicularly to the general direction of flow through the conduit. When the fluid is passed through the conduit with a pulsatile flow, eddies are formed in the furrows promoting the above mentioned rotational flow and hence mixing of the fluid.

The invention is particularly concerned with three improvements to an apparatus of the kind forming the subject matter of specification No. 1,442,754.

In accordance with a first aspect of the invention, the furrows extend obliquely to the general direction of fluid flow through the conduit. As a result, as the general direction of fluid flow through the conduit has a component along the oblique furrows, the eddies not only promote a movement of the liquid perpendicularly to the membrane but also set up helical vortices along the furrows, thus increasing the mixing effect.

Both the conduits, for the respective fluids between which the transfer is to be effected, may be provided with the oblique furrows to promote mixing. Thus in any two adjacent conduits, the intervening membrane may be provided with furrows facing into one conduit and the other conduit may be provided at its wall remote from the first conduit with furrows in alignment with the ridges in the membrane corresponding to the furrows in the first conduit. Alternatively, if the intervening membrane is symmetrically undulating, furrows may form in the membrane facing into one conduit out of phase with the furrows facing into the other conduit.

When the conduits are defined between pairs of predominantly planar surfaces, the furrows preferably extend at substantially 45° to the general direction of fluid flow so that the two fluids separated by a common membrane will experience the same effect from the furrows irrespective of whether the fluids flow in cross current or counter current. Cross current is preferred to simplify the positioning of the separate inlet and outlet manifolds for the two fluids at opposite ends of the respective conduits.

In accordance with a second aspect of the invention, which is useful irrespective of whether the furrows extend perpendicularly or obliquely to the general direction of fluid flow in the conduit, but which is only relevant when the conduit is defined between two predominantly planar surfaces, the two surfaces defining the conduit are separated, along the ridges between the furrows, by discontinuous webs, the openings in which provide communication between adjacent furrows and allow the fluid to pass from one furrow to the next as jets. These jets assist in setting up eddies and helical vortices in the furrows into which they discharge. The effect is improved if the openings in one web are out of alignment with the openings in the adjacent web so that the jets do not pass directly through the openings in adjacent webs but are deflected back by the portion of the adjacent webs against which they are directed.

The pulsatile flow of fluid through the conduit may be uni-directional or reciprocatory. Typically, however, the liquid is continuously pumped through the apparatus, for example by means of a roller pump, and uni-directional or reciprocatory pulsations are superimposed by means of appropriate pulsatile pumps or non-return valving, as described in specification No. 1,422,754. In accordance with the third aspect of the invention, which is relevant when the fluid is a liquid, the pulsatile pump comprises mechanically linked and mechanically operated actuators which apply pressure alternately to flexible diaphragms associated with inlet and outlet manifolds for the liquid at the opposite ends of the conduit.

An example of an artificial kidney constructed in accordance with the present invention is illustrated diagrammatically in the accompanying drawings, in which.

Figure 1:
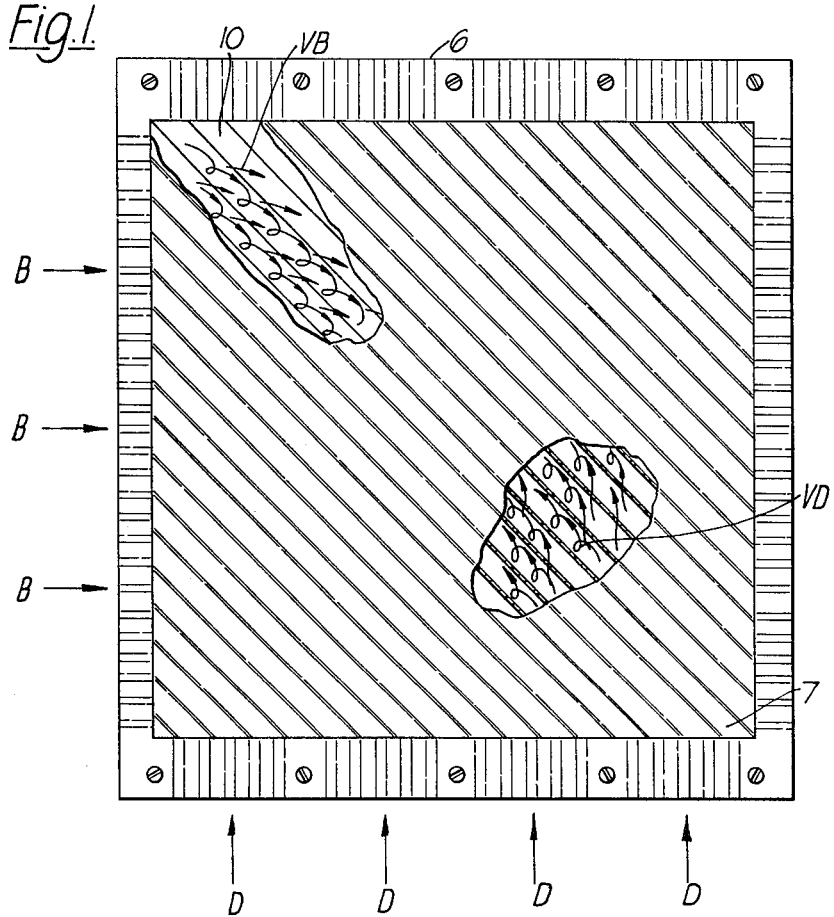
FIG. 1 is a plan of the membrane envelopes and support therefor, with parts broken away.
Figure 2:
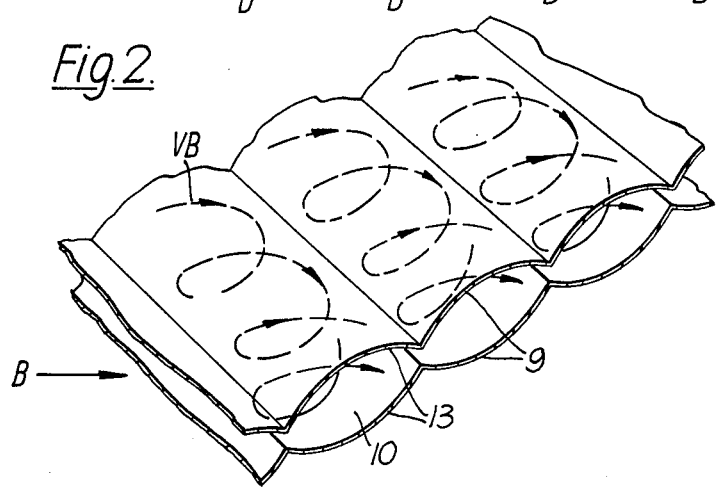
FIG. 2 is a perspective detail of part of a blood envelope.
Figure 3:
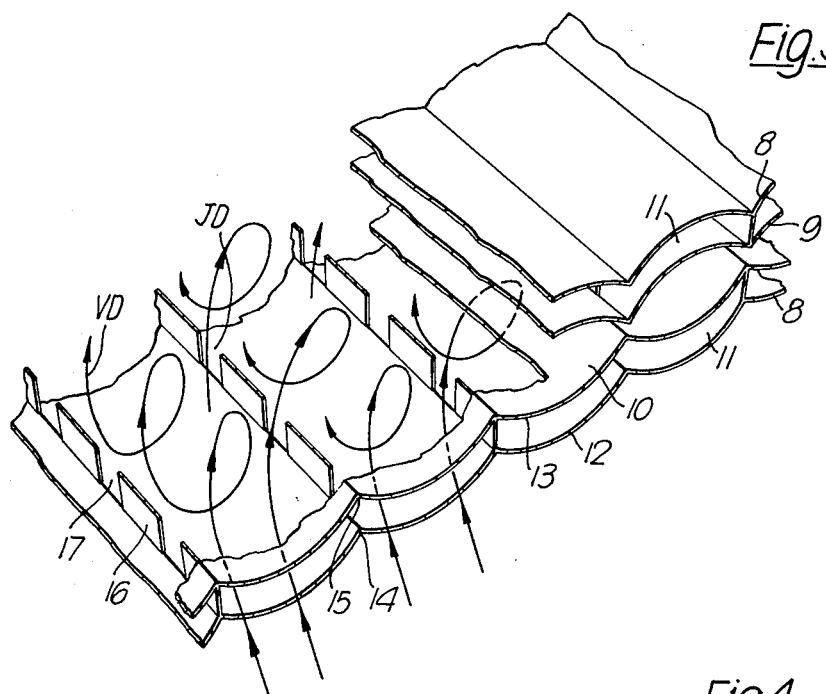
FIG. 3 is a perspective detail of part of the membrane envelopes for the blood and dialysate; and, FIG. 4 is an elevation of the apparatus.

The blood and dialysate conduits are supported in a square housing 5 formed by upper and lower plates 6 which are spaced apart and the inner surfaces of which are formed with an array of diagonal furrows 7 extending at 45° to the sides of the plate. The furrows are only shown diagrammatically in FIG. 1 in that in practice the furrowed portion of each plate has a side of 15 cm and there are approximately 45 furrow ends per side so that each furrow is approximately 3 mm wide and between 1 and 1.5 mm deep. Located between the plates are three membrane envelopes consisting of two outer impermeable membranes 8 and two inner semi-permeable membranes 9. The semi-permeable membranes are made of conventional transfer membrane material as disclosed in the earlier specification No. 1,442,754.

A conduit 10 is formed for blood between the two membranes 9 and two conduits 11 for dialysate are formed between the adjacent pairs of conduits 8 and 9. Each of the membranes is shaped to provide a series of parallel furrows 12 and 13 separated by ridges 14 and 15 respectively. The sizes of all the furrows correspond with those in each of the plates 6. The separations of the adjacent pairs of membranes 8 and 9 and the minimum separation of the membranes 9 at the ridges 15 are substantially 0.5 mm. The spaces corresponding to the furrows 12 in the conduits 11 are separated by discontinuous spacer webs 16 in which rectangular slots 17 each 0.5 mm. deep and 0.5 mm. wide are spaced at 1 mm. intervals along the webs. Similar webs may be provided in the conduit 10.

The conduits 11 are each sealed along one pair of opposite edges, that is the upper and lower edges as seen in FIG. 1, and the conduit 10 is sealed along its pair of opposite edges which are the left and right hand edges in FIG. 1.

The membranes 8 and 9 adopt their furrowed shape by being assembled flat and appropriately sealed together and placed between the furrowed plates 6. The conduits 10 and 11 are pumped full of water which causes the plastics material from which the membranes are made to yield plastically beyond their elastic limit and adopt permanently the final shape, with the membranes 8 nesting in the furrows in the plates 6.

Figure 4:
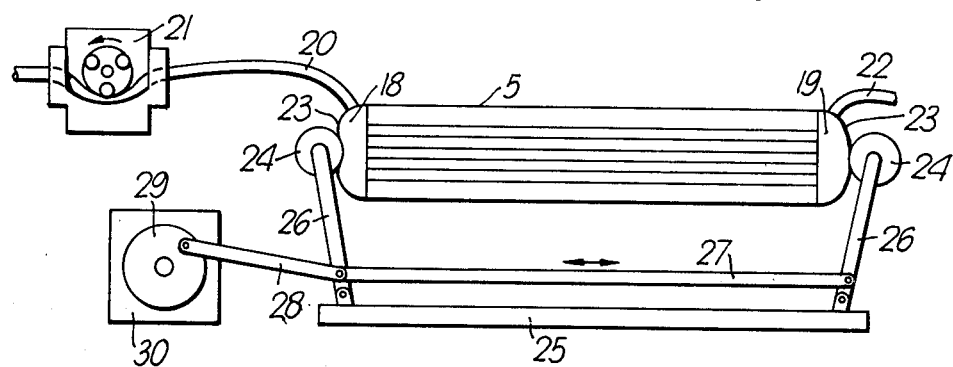

The open ends of each conduit are connected to inlet and outlet manifolds of which the inlet and outlet manifolds 18 and 19 for the blood are shown in FIG. 4. A blood inlet line 20 leads into the manifold 18 from a conventional roller pump 21 and a blood outlet line 22 leads from the manifold 19. The manifolds 18 and 19 are each provided with a flexible diaphragm 23 which is engaged by a respective pad actuator 24. The actuators 24 are mounted on a base 25 by pivoted arms 26. These arms 26 are interconnected by a pivotal link 27 in turn pivoted to a connecting rod 28 driven via a crank 29 from an electric motor 30. Upon operation of the motor the arms 26 pivot to and fro together so that the diaphragms 23 are alternately compressed.

The roller pump 21 provides a slightly pulsatile unidirectional mean flow through the conduit 10 and the actuators 24 alternately reduce the volumes of the manifolds 18 and 19 by equal amounts to provide a superimposed reciprocatory motion on the flow. The optimum form of the flow is described in more detail in the earlier specification No. 1,442,754.

It is to be appreciated that reciprocatory pulsatile flow of the dialysate through the conduits 11 is provided in exactly the same way as shown in FIG. 4 for the blood, with the inlet and outlet manifolds for dialysate being at the other two edges of the plate 6. The link corresponding to the link 27 for the pad actuators for the dialysate manifolds passes over the link 27 shown in FIG. 4.

The value of the flexible diaphragms 23 and pad actuators 24 for providing the reciprocatory components of flow is that the diaphragms conform to the contours of the pad actuators and roll with the actuators without slipping.

The blood flow is shown by the arrows B in the drawings and the dialysate flow by the arrows D. It will be appreciated that they flow in cross current but the general direction of each flow is at 45° to the furrows 12 and 13. Consequently helical vortices VB are set up between the furrows 13 and the blood conduit 10 promoting better homogeneous contact between the blood and membranes 9. Similar vortices VD are set up in the furrows 12 in the dialysate conduits 11. These are enhanced by the openings 17 through which jets JD of the dialysate pass and are deflected by the solid portions of the adjacent webs 16.

Using conventional membranes and suitably scaled mean blood and dialysate flow rates transfer rates of NaCl and Vitamin B12, which are small and middle molecule markerscorresponding to solutes removed in haemodialysis, equal to the membrane limit have been achieved. This enables an appreciable increase over the performance of conventional dialysers using the same membranes. However, the low hydraulic resistance of the dialyser lends itself to the use of highly permeable membranes which enable a further improvement in performance which may approach a factor of two or three, to be achieved.

Although the invention has been specifically described with relation to an artificial kidney, in which the transfer membranes are capable of passing selected molecules, the invention is equally applicable to heat transfer systems. In the latter case, the transfer membranes would usually be made of a suitable metal.

We claim:

1. Apparatus for effecting transfer of heat or mass between two fluids through a transfer membrane, comprising a conduit for flow of one of the fluids defined between two predominantly planar surfaces of which at least one is provided by the membrane, a dimension transverse to the conduit of at least one of the surfaces varying, either inherently or in response to pressure of fluid therein, in a regularly repeating manner along the length of the conduit to provide a multiplicity of furrows separated by ridges in that surface, the apparatus also comprising means communicating with the conduit for passing fluid through the conduit in pulsatile flow; wherein the two surfaces are separated, along the ridges between the furrows, by discontinuous webs extending from one planar surface to the ridges on the other planar surface, the web openings provide communication between adjacent furrows and allow the fluid to pass from one furrow to the next as jets to give rise in the furrows to a rotary fluid flow having components of motion parallel and perpendicular to the general direction of flow in the conduit of said one of the fluids.

2. Apparatus according to claim 1, in which the openings in one web are out of alignment with the openings in the adjacent web.

3. Apparatus according to claim 1 or claim 2, in which the fluid is a liquid, and the means for passing fluid through the conduit in pulsatile flow comprises a unidirectional pump for providing mean flow and a pulsatile pump for superimposing reciprocatory pulsations on the mean flow, the pulsatile pump comprising mechanically linked and mechanically operated actuators which apply pressure alternately to flexible diaphragms associated with inlet and outlet manifolds for the liquid at the opposite ends of the conduit.

4. Apparatus according to claim 3, in which the unidirectional pump is a roller pump.

5. Apparatus for effecting transfer of heat or mass between two fluids through a transfer membrane, comprising a conduit for flow of one of the fluids at least partly defined by the membrane, a transverse dimension of the conduit varying, either inherently or in response to pressure of fluid therein, in a regularly repeating manner along the length of the conduit to provide a multiplicity of hollows, the apparatus also comprising means communicating with the conduit for passing fluid through the conduit in pulsatile flow, the arrangement being such that pulsation of fluid past the hollows gives rise in the hollows to a rotary fluid flow having components of motion parallel and perpendicular to the general direction of flow in the conduit of said one of the fluids; wherein the means for passing fluid through the conduit in pulsatile flow comprises a unidirectional pump for providing mean flow and a pulsatile pump for superimposing reciprocatory pulsations on the mean flow, the pulsatile pump comprising mechanically linked and mechanically operated actuators which apply pressure alternately to flexible diaphragms associated with and in fluid communication with inlet and outlet manifolds for the liquid at the opposite ends of the conduit to cause a liquid flow component in alternate directions along the conduit.

6. Apparatus according to claim 5, in which the unidirectional pump is a roller pump.

7. Apparatus for effecting transfer of heat or mass between two fluids through a transfer membrane, comprising a conduit for flow of one of the fluids at least partly defined by the membrane, a transverse dimension of the conduit varying, either inherently or in response to pressure of fluid therein, in a regularly repeating manner along the length of the conduit to provide a multiplicity of hollows, the apparatus also comprising means communicating with the conduit for passing fluid through the conduit in pulsatile flow, the arrangement being such that pulsation of fluid past the hollows gives rise in the hollows to a rotary fluid flow having components of motion parallel and perpendicular to the general direction of flow in the conduit of said one of the fluids; wherein the hollows are furrows extending obliquely to the general direction of fluid flow through the conduit, wherein said conduit and said means cooperate so that the rotary fluid flow has an additional component along the hollows and the flow involves helical vortices along the hollows, wherein adjacent furrows are separated by discontinuous webs, the openings in the webs providing communication between adjacent furrows to allow the fluid to pass from one furrow to the next as jets to give rise in the furrows to said rotary fluid flow having components of motion parallel and perpendicular to the general direction of flow in the conduit of said one of said fluids.

8. Apparatus according to claim 7, further comprising a second conduit for the second fluid, the two conduits being separated by an intervening membrane in which the furrows are formed.

9. Apparatus according to claim 8, in which the wall of the second conduit remote from the first conduit is provided with furrows in alignment with the ridges in the membrane corresponding to the furrows in the first conduit.

10. Apparatus according to claim 8, in which the general direction of flow of the fluids through the two conduits is in cross current and the furrows extend at substantially 45° to the general direction of fluid flow.

11. Apparatus according to claim 7, in which the furrows extend at substantially 45° to the general direction of fluid flow.

12. Apparatus according to claim 7, in which the two surfaces defining the conduit are separated, along the ridges between the furrows, by discontinuous webs, the openings in which provide communication between adjacent furrows and allow the fluid to pass from one furrow to the next as jets.

13. Apparatus according to claim 12, in which the openings in one web are out of alignment with the openings in the adjacent web.

14. Apparatus according to claim 7, in which the fluid is a liquid, and the means for passing fluid through the conduit in pulsatile flow comprises a unidirectional pump for providing mean flow and a pulsatile pump for superimposing reciprocatory pulsations on the mean flow, the pulsatile pump comprising mechanically linked and mechanically operated actuators which apply pressure alternately to flexible diaphragms associates with inlet and outlet manifolds for the liquid at the opposite ends of the conduit.

15. Apparatus according to claim 14, in which the unidirectional pump is a roller pump.

* * * * *